United States Patent
Yasuda et al.

(10) Patent No.: US 12,532,904 B2
(45) Date of Patent: Jan. 27, 2026

(54) BILE ACID ADSORBING AGENT COMPOSED OF IMIDAZOLE SILANE-TREATED SILICA

(71) Applicants: SHIN-ETSU CHEMICAL CO., LTD., Tokyo (JP); TOHOKU UNIVERSITY, Sendai (JP)

(72) Inventors: Shigeki Yasuda, Annaka (JP); Tsuneo Kimura, Annaka (JP); Munenao Hirokami, Annaka (JP); Masaki Tanaka, Tokyo (JP); Naoki Tanaka, Sendai (JP)

(73) Assignees: SHIN-ETSU CHEMICAL CO., LTD., Tokyo (JP); TOHOKU UNIVERSITY, Sendai (JP)

( * ) Notice: Subject to any disclaimer, the term of this patent is extended or adjusted under 35 U.S.C. 154(b) by 358 days.

(21) Appl. No.: 18/032,489

(22) PCT Filed: Sep. 27, 2021

(86) PCT No.: PCT/JP2021/035271
§ 371 (c)(1),
(2) Date: Apr. 18, 2023

(87) PCT Pub. No.: WO2022/091663
PCT Pub. Date: May 5, 2022

(65) Prior Publication Data
US 2023/0380464 A1    Nov. 30, 2023

(30) Foreign Application Priority Data
Oct. 27, 2020   (JP) ................... 2020-179279

(51) Int. Cl.
*A23L 29/00* (2016.01)
*A23L 5/00* (2016.01)
*A23L 33/00* (2016.01)

(52) U.S. Cl.
CPC .............. *A23L 29/045* (2016.08); *A23L 5/00* (2016.08); *A23L 33/30* (2016.08)

(58) Field of Classification Search
CPC ........... A23L 29/045; A23L 5/00; A23L 33/30
USPC ........................................................ 426/74
See application file for complete search history.

(56) References Cited

U.S. PATENT DOCUMENTS

| 3,499,960 | A | 3/1970 | Macek et al. |
| 4,777,042 | A | 10/1988 | Toda et al. |
| 2009/0232950 | A1 | 9/2009 | Brothers, Jr. et al. |

FOREIGN PATENT DOCUMENTS

| ES | 2713627 T3 * | 5/2019 | .......... A61K 9/5089 |
| JP | 60-209523 A | 10/1985 | |
| JP | 5-39295 A | 2/1993 | |
| JP | 3523804 B2 | 4/2004 | |
| JP | 3555845 B2 | 8/2004 | |
| JP | 2008-523806 A | 7/2008 | |
| WO | WO-2014072363 A1 * | 5/2014 | ................ A61P 5/50 |

OTHER PUBLICATIONS

Translation ES2713627 (Year: 2019).*
Belyakova, Designing of the centers for adsoprtion of bile acid on a silica surface, 2006 (Year: 2006).*
CAS 70851-51-3 (Year: n/a) (Year: 2025).*
Eslami et al., "Dietary pattern, colonic microbiota and immunometabolism interaction: new frontiers for diabetes mellitus and related disorders", Diabetic Medicine, Oct. 6, 2020; e14415, pp. 1-15.
International Search Report for PCT/JP2021/035271 mailed on Nov. 16, 2021.
Mahkam et al., "Preparation of Ionic Liquid Functionalized Silica Nanoparticles for Oral Drug Delivery", Journal of Biomaterials and Nanobiotechnology, 2012, vol. 3, pp. 391-395.

(Continued)

*Primary Examiner* — Jennifer McNeil
(74) *Attorney, Agent, or Firm* — Birch, Stewart, Kolasch & Birch, LLP

(57) ABSTRACT

This bile acid adsorbing agent composed of silica particles, to which an organosilicon compound represented by general formula (1) is bonded, has the advantage that water-absorption swelling does not occur.

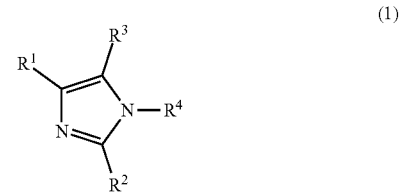

(1)

(In formula (1), $R^1$, $R^2$, and $R^3$ each independently represent a hydrogen atom, a C1-C20 alkyl group, a vinyl group, a phenyl group, or a benzyl group, and $R^4$ represents a group represented by general formula (2), provided that $R^1$ and $R^3$ may be bonded to each other to form a benzene ring.)

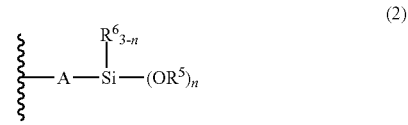

(2)

(In formula (2), A represents a linear or branched divalent linking group which may contain a heteroatom, a urethane bond, a urea bond, a thiourethane bond, and/or a thiourea bond, $R^5$'s each independently represent a C1-C10 alkyl group or a C6-C10 aryl group, $R^6$'s each independently represent a C1-C10 alkyl group or a C6-C10 aryl group, and n represents an integer of 1-3.).

6 Claims, No Drawings

(56) References Cited

OTHER PUBLICATIONS

Ridlon et al., "Taurocholic acid metabolism by gut microbes and colon cancer", Gut Microbes, 2016, vol. 7, No. 3, pp. 201-215.
Watanabe, "1. Intervention in obesity and disorder of glycolipid metabolism via bile acid metabolism, From knowledge of farnesoid X receptor and TGR5/M-Bar", New strategy for treating disorder of glycolipid metabolism, Tonyobyo, Diabetes, 2011, vol. 54, No. 3, pp. 156-160, total 14 pages.
Written Opinion of the International Searching Authority for PCT/JP2021/035271 mailed on Nov. 16, 2021.

* cited by examiner

BILE ACID ADSORBING AGENT COMPOSED OF IMIDAZOLE SILANE-TREATED SILICA

TECHNICAL FIELD

The present invention relates to a bile acid adsorbent composed of imidazole silane-treated silica.

BACKGROUND ART

Obesity and metabolic diseases such as diabetes associated with obesity have been on the rise in recent years. These conditions not only affect people's health, they also pose a major threat in terms of increasing medical costs.

Non-Patent Documents 1 to 3 mention that the increase in the amount of bile acids accompanying fat consumption exerts an influence on metabolic diseases such as obesity, type II diabetes, hyperlipemia and fatty liver. They also point out the possibility, with regard to colorectal cancer for which the number of patients is rapidly rising, that bile acids play a part in carcinogenesis.

In order to prevent or treat these diseases, bile acid adsorbents for adsorbing fat absorption-promoting bile acids and facilitating their excretion outside of the body have been reported in the literature. Basic anion exchange resins are commonly used as bile acid adsorbents. For example, Patent Document 1 mentions anion exchange resins which contain an aliphatic quaternary ammonium salt as the functional groups.

However, anion exchange resin preparations such as cholestyramine have the drawback that their activity is low, and so the dosage administered is high. Also, anion exchange resins containing a quaternary ammonium salt have the offensive odor of fatty amines, and therefore cannot be furnished for practical use in this state. Actually, the offensive odor is reduced by coating the anion exchange resin, but because the anion exchange capacity decreases due to surface coating, the dosage must be increased. Additional challenges are that, because of swelling due to water absorption, the preparation is difficult to take and remains within the mouth, making it very unpleasant. Moreover, there are dosage limitations on account of side effects such as diarrhea, pain, heartburn and vomiting, and treatment takes time.

Patent Document 2 discloses an anion exchange resin having imidazolyl groups which overcomes these problems. This anion exchange resin has a higher bile acid adsorption capacity than conventional cholestyramine, but there still remain issues with swelling due to water absorption and with side effects.

PRIOR ART DOCUMENTS

Patent Documents

Patent Document 1: U.S. Pat. No. 3,499,960
Patent Document 2: JP-A S60-209523

Non-Patent Documents

Non-Patent Document 1: Jason M. Ridlon et al., *Gut Microbes*, 2016, 7(3), 201-215.
Non-Patent Document 2: M. Eslami et al., *Diabet. Med.* 2020 Oct. 6; e14415.
Non-Patent Document 3: M. Watanabe, *Tonyobyo* 54(3), 2011, 156-160.

SUMMARY OF INVENTION

Technical Problem

In light of the above circumstances, the object of the present invention is to provide a bile acid adsorbent that is free of swelling due to water absorption.

Solution to Problem

The inventors have conducted intensive investigations aimed at achieving this object and have discovered as a result that silica treated with an organosilicon compound having an imidazole structure possesses a bile acid-adsorbing effect and moreover does not exhibit swelling due to water absorption. This discovery ultimately led to the present invention.

Accordingly, the invention provides:

1. A bile acid adsorbent containing silica particles to which an organosilicon compound of general formula (1) below is bonded

[Chem. 1]

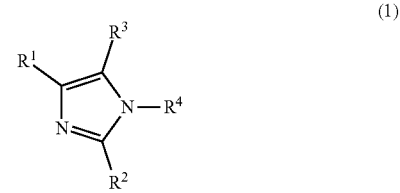

(wherein $R^1$, $R^2$ and $R^3$ are each independently a hydrogen atom, an alkyl group of 1 to 20 carbon atoms, a vinyl group, a phenyl group or a benzyl group, with the proviso that $R^1$ and $R^3$ may mutually bond to form a benzene ring; and $R^4$ is a group of general formula (2) below

[Chem. 2]

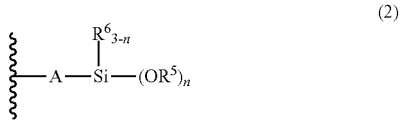

(wherein A is a linear or branched divalent linkage group which may include a heteroatom, an ether bond, a urethane bond, a urea bond, a thiourethane bond and/or a thiourea bond;
each $R^5$ is independently an alkyl group of 1 to 10 carbon atoms or an aryl group of 6 to 10 carbon atoms; each $R^6$ is independently an alkyl group of 1 to 10 carbon atoms or an aryl group of 6 to 10 carbon atoms; and n is an integer from 1 to 3)).

2. The bile acid adsorbent of 1 above, wherein $R^4$ is a group of any one of formulas (3) to (12) below

[Chem. 3]

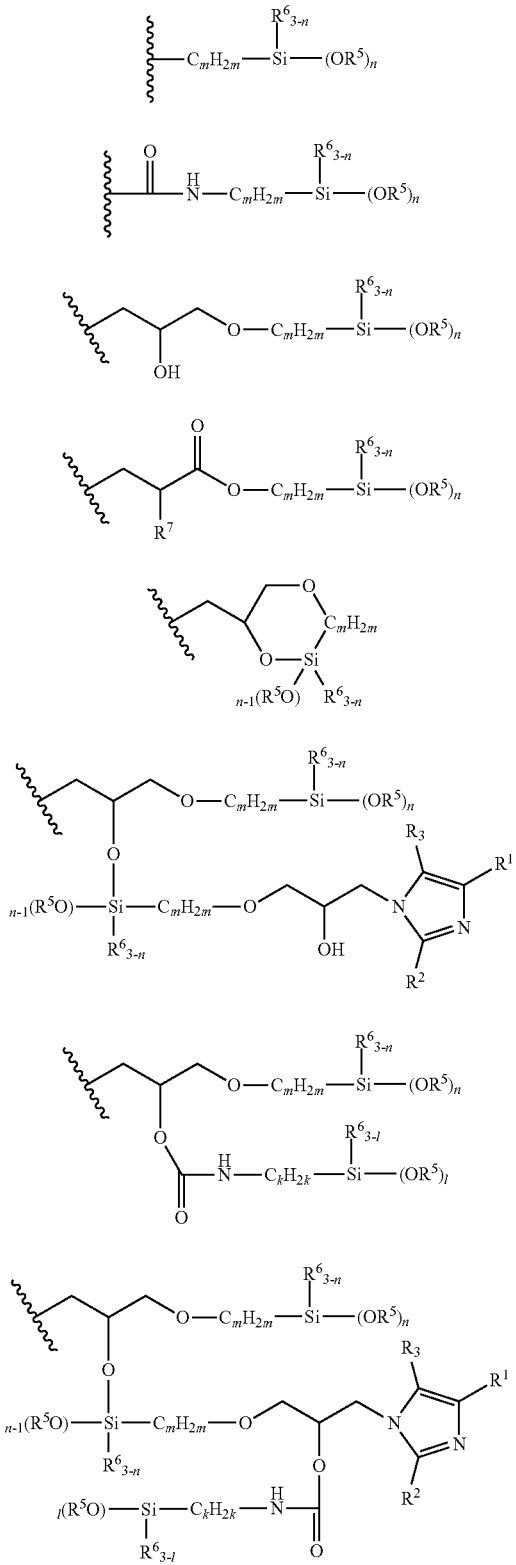

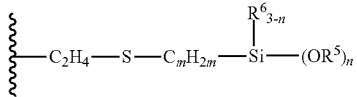

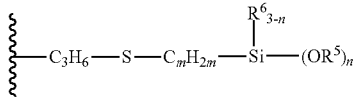

(wherein m is an integer from 1 to 12, $R^7$ is a hydrogen atom or an alkyl group of 1 to 3 carbon atoms, k is an integer from 1 to 12, l is an integer from 1 to 3, and $R^1$, $R^2$, $R^3$, $R^5$, $R^6$ and n are as defined above).

3. A preparation which includes the bile acid adsorbent of 1 or 2 above and an enteric coating.

4. The preparation of 3 above, wherein the enteric coating includes one or more selected from the group consisting of hydroxypropyl methylcellulose phthalate, hydroxypropyl methylcellulose acetate succinate and carboxymethyl ethyl cellulose.

5. A food product which includes the bile acid adsorbent of 1 or 2 above.

6. A supplement which includes the bile acid adsorbent of 1 or 2 above.

Advantageous Effects of Invention

Because the inventive bile acid adsorbent composed of an imidazolesilane-treated silica does not exhibit swelling due to water absorption, the unpleasant sensation when ingested and the side effects are minimal, enabling this adsorbent to be taken in a larger amount than conventional preparations.

DESCRIPTION OF EMBODIMENTS

The invention is described in detail below.
The bile acid adsorbent of the invention is characterized by being composed of silica to which an organosilicon compound of general formula (1) is bonded.

[Chem. 4]

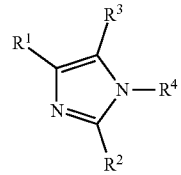

In formula (1), $R^1$, $R^2$ and $R^3$ are each independently a hydrogen atom, an alkyl group of 1 to 20 carbon atoms, a vinyl group, a phenyl group or a benzyl group. $R^1$ and $R^3$ may mutually bond to form a benzene ring.

The alkyl group of 1 to 20 carbon atoms may be linear, cyclic or branched. Specific examples include methyl, ethyl, n-propyl, i-propyl, n-butyl, isobutyl, s-butyl, t-butyl, n-pentyl, neopentyl, n-hexyl, n-heptyl, n-octyl, n-nonyl, n-decyl, cyclopropyl, cyclobutyl, cyclopentyl, cyclohexyl, cycloheptyl and cyclooctyl groups.

Of these, in cases where the silica is treated with an aqueous solution, $R^1$ to $R^3$ are preferably hydrogen atoms or alkyl groups of 1 to 3 carbon atoms. In particular, it is more preferable for $R^1$ and $R^3$ to be hydrogen atoms and for $R^2$ to be an alkyl group of 1 to 3 carbon atoms, especially a methyl group.

$R^4$ is a group of general formula (2) below.

[Chem. 5]

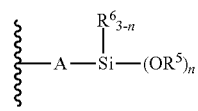
(2)

In formula (2), A is a linear or branched divalent linkage group which may include a heteroatom such as nitrogen, sulfur, oxygen or silicon, a urethane bond, a urea bond, a thiourethane bond and/or a thiourea bond; each $R^5$ is independently an alkyl group of 1 to 10 carbon atoms or an aryl group of 6 to 10 carbon atoms; and each $R^6$ is independently an alkyl group of 1 to 10 carbon atoms or an aryl group of 6 to 10 carbon atoms.

The subscript n is an integer from 1 to 3, but is preferably 2 or 3, and more preferably 3.

Specific examples of the aryl group of 6 to 10 carbon atoms include phenyl, α-naphthyl, and β-naphthyl groups. Specific examples of the alkyl group of 1 to 10 carbon atoms include the same groups as those mentioned above for $R^1$.

Of these, $R^5$ is preferably a methyl or ethyl group, and $R^6$ is preferably a methyl group.

Examples of the divalent linkage group A include alkylene groups of 1 to 20 carbon atoms, preferably 1 to 12 carbon atoms, and divalent groups having the aforementioned heteroatom, urethane bond, urea bond, thiourethane bond or thiourea bond partway along and/or at an end of an alkylene group chain. The heteroatom may be present as a substituent on a divalent linkage group that is an alkylene group; examples of such substituents include hydroxyl, amino, organosilyl and imidazolyl groups.

In cases where a hydroxyl group is present on a divalent linkage group, this hydroxyl group may bond with the silicon atom in formula (2) to form a ring structure.

In the invention, the group of formula (2) which includes a suitable divalent linkage group A is exemplified by, but not limited to, groups of formulas (3) to (12) below.

[Chem. 6]

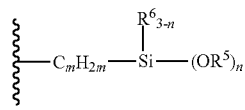
(3)

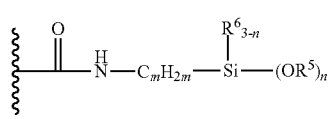
(4)

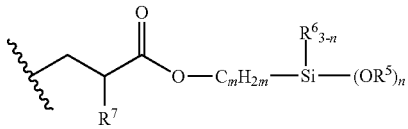
(5)

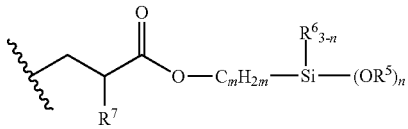
(6)

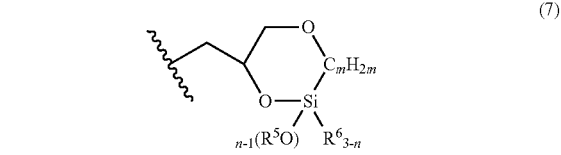
(7)

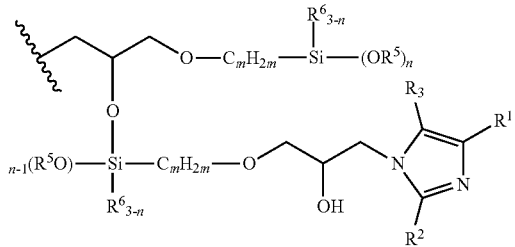
(8)

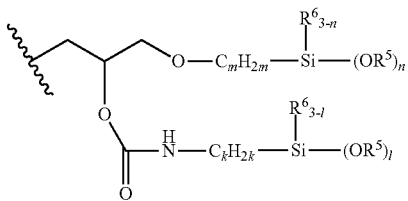
(9)

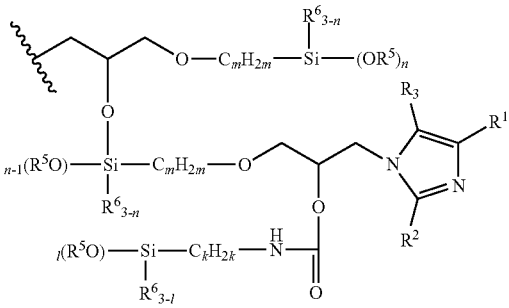
(10)

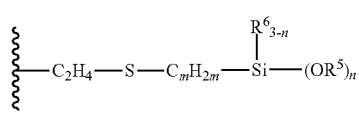
(11)

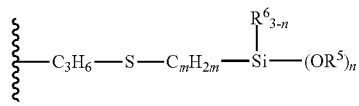
(12)

In these formulas, $R^1$, $R^2$, $R^3$, $R^5$, $R^6$ and n are as defined above.

In the above formulas, $R^7$ represents a hydrogen atom or an alkyl group of 1 to 3 carbon atoms. Specific examples of alkyl groups of 1 to 3 carbon atoms include methyl, ethyl and n-propyl groups.

The subscript 'm' is an integer from 1 to 12, preferably 2 or 3, and more preferably 3.

The subscript 'k' is an integer from 1 to 12, preferably 2 or 3, and more preferably 3.

The subscript 'l' is an integer from 1 to 3, preferably 2 or 3, and more preferably 3.

The above organosilicon compound can be obtained by reacting an imidazole compound with an alkoxysilyl group-containing organosilicon compound while stirring under applied heat.

Specific examples of the imidazole compound include imidazole, 2-methylimidazole, 2-n-propylimidazole, 2-isopropylimidazole, 2-undecylimidazole, 2-phenylimidazole, 2,4-dimethylimidazole, 2-ethyl-4-methylimidazole, 2-phenyl-4-methylimidazole, 1-vinylimidazole, 2-methyl-1-vinylimidazole, 1-allylimidazole and 1-allyl-2-methylimidazole.

Specific examples of the alkoxysilyl group-containing organosilicon compound include 3-chloropropyltrimethoxysilane, 3-chloropropylmethyldimethoxysilane, 3-chloropropyltriethoxysilane, 3-isocyanatopropyltrimethoxysilane, 3-isocyanatopropyltriethoxysilane, 3-glycidoxypropyltrimethoxysilane, 3-glycidoxypropylmethyldimethoxysilane, 3-glycidoxypropyltriethoxysilane, 3-methacryloxypropyltrimethoxysilane, 3-methacryloxypropylmethyldimethoxysilane, 3-methacryloxypropyltriethoxysilane, 3-acryloxypropyltrimethoxysilane, 3-acryloxypropylmethyldimethoxysilane, 3-acryloxypropyltriethoxysilane, 3-mercaptopropyltrimethoxysilane, 3-mercaptopropylmethyldimethoxysilane and 3-mercaptopropyltriethoxysilane.

The imidazole compound and the alkoxysilyl group-containing organosilicon compound are each selected in accordance with the imidazole group and the alkoxysilyl group in formula (1).

For example, in the case of an organosilicon compound having a group of formula (3), 3-chloropropyltrimethoxysilane is selected as the alkoxysilyl group-containing organosilicon compound and 2-methylimidazole or the like is selected as the imidazole compound.

A solvent may be used in these reactions. Specific examples of solvents that may be used include hydrocarbon solvents such as pentane, hexane, cyclohexane, heptane, isooctane, benzene, toluene and xylene; polar aprotic solvents such as N,N-dimethylformamide; and polar protic solvents such as methanol.

A catalyst may be used in these reactions.

For example, a common catalyst used in dehydrochlorination reactions (e.g., a tertiary amine such as triethylamine) may be used when synthesizing an organosilicon compound having a group of formula (3).

Alternatively, a common catalyst used in urethane formation reactions (e.g., an organotin compound such as dioctyltin dilaurate) may be used when synthesizing an organosilicon compound having a group of formula (9) or (10).

Or a common catalyst used in thiol-ene reactions (e.g., a radical generator such as azobisisobutyronitrile) may be used when synthesizing an organosilicon compound having a group of formula (11) or (12).

From the standpoint of the ease of silica treatment with an organosilicon compound having an imidazoline group, the silica to be treated preferably has silanol groups.

The bile acid adsorbent of the invention can be obtained by treating silica with the above-described organosilicon compound having an imidazole group. The silica treatment method may be an ordinary method, although a wet process capable of uniform treatment is preferred.

The amount of the organosilicon compound having imidazole groups used in treatment is not particularly limited, but is preferably from 0.001 to 20 parts by weight, and more preferably from 0.01 to 15 parts by weight, per 100 parts by weight of silica. At less than 0.001 part by weight, the anticipated effects may be inadequate; an amount in excess of 20 parts by weight is undesirable from the standpoint of cost.

The solvent used to disperse silica in the wet process is not particularly limited, so long as it is a polar solvent in which silica readily disperses. Examples of such polar solvents include water; alcohols such as methanol, ethanol and isopropanol; ethers; and ketones. From the standpoint of reacting the imidazole group-containing organosilicon compound with silica particles, a solvent that includes water is preferred.

To enhance the stability and dispersibility of silica particles, a small amount of surfactant, polar solvent or the like may be added.

The temperature of silica treatment is not particularly limited. However, from the standpoint of reactivity, heating is preferred, with 1 to 10 hours of reaction at between and 60° C. being desired.

Following the reaction, the silica is taken out, such as by filtration with filter paper, and residual solvent is removed by vacuum drying, enabling silica that has been treated with an imidazole group-containing organosilicon compound to be obtained. In the resulting silica, the imidazole group-containing organosilicon compound has been introduced onto at least a portion of the particle surfaces.

The bile acid adsorbent of the invention may be formulated and used as a preparation for the prevention and treatment of lifestyle diseases such as obesity, type II diabetes, hyperlipemia and fatty liver, and also inflammatory bowel disease, disorders of the intestinal mucosa and colorectal cancer. In such cases, pharmaceutically acceptable compounding ingredients such as ordinary carriers, binders, stabilizers, excipients, diluents, pH buffers, disintegrators, tonicity agents, additives, coating agents, solubilizers, lubricants, glidants, dissolution aids, flavoring agents, sweeteners, solvents, gelling agents and nutrients may also be added.

Specific examples of these compounding ingredients include water, physiological saline, animal fats and oils, vegetable oils, lactose, starch, gelatin, crystalline cellulose, gum, talc, magnesium stearate, hydroxypropyl cellulose, polyalkylene glycol, polyvinyl alcohol and glycerin.

Preparations containing the bile acid adsorbent of the invention are preferably in the form of tablets, capsules or the like having an enteric coating in order to protect the preparation from stomach acids or to protect the gastric mucosa from, for example, irritation of the stomach wall.

Enteric coating may be carried out by a common technique such as the method described in JP No. 3628401.

One exemplary method is a solid drug coating method in which a solid drug in the form of granules or fine grains is stirred within a centrifugal flow coating device, during which time the drug is sprinkled with an enteric coating while being sprayed with a liquid plasticizer or a liquid, or with wax in a heat-molten liquid state.

Examples of enteric coatings include celluloses such as cellulose acetate phthalate, cellulose acetate trimethate, hydroxypropylmethylcellulose phthalate, hydroxypropylmethylcellulose acetate succinate and carboxymethyl ethyl cellulose; polyvinyl alcohol acetate phthalate; and copolymers of methacrylic acid and ethyl acrylate.

Of the above enteric coatings, from the standpoint of pH responsiveness and resistance to hydrolysis, an enteric methylcellulose such as hydroxypropyl methylcellulose phthalate, hydroxypropyl methylcellulose acetate succinate or carboxymethyl ethyl cellulose is preferred.

The route of administration of the inventive bile acid adsorbent is preferably oral, and the dosage is suitably set according to, for example, age, body weight, gender, symptoms, and sensitivity to the drug. The dosage range is typically from 1 μg to 200 mg/day, preferably from 2 μg to 2,000 μg/day, more preferably from 3 to 200 μg/day, and even more preferably from 4 to 20 μg/day. Administration is carried once daily or as several divided doses (e.g., from 2 to 4 times) per day, and the dosage may be adjusted with amelioration of the symptoms.

No particular limitation is imposed on the method of ingestion and the form of health food products containing the bile acid adsorbent of the invention.

For example, health food products containing the bile acid adsorbent of the invention may be eaten as a meal substitute or as a snack between meals. In such cases, the bile acid adsorbent may be prepared together with at least one foodstuff selected from the group consisting of rice flour, buckwheat flour, udon noodle flour, wheat flour and bread crumbs, and used in normal cuisine. Alternatively, these may also be processed and used in sweets, buckwheat noodles, udon noodles, pasta, bread and the like.

Also, the health food product may be in the state of a solid (powder, granules), jelly, liquid or suspension, and may contain various types of ingredients, such as sweeteners and acidulants.

Supplements containing the bile acid adsorbent of the invention may be used in the same way as commercial supplements which suppress fat absorption.

The compounding ingredients included in supplements that contain the bile acid adsorbent of the invention are not particularly limited. Specific examples of compounding ingredients include commonly used ingredients such as wheat starch, rice starch, cornstarch, lactose, maltose, sucrose, glucose, gelatin and vegetable oils.

Supplements containing the bile acid adsorbent of the invention are in the form of tablets, capsules, liquids, powders or soft capsules, and may be produced in accordance with production methods for ordinary supplements.

EXAMPLES

The invention is described more fully below by way of Synthesis Examples, Examples according to the invention and Comparative Examples, although these Examples do not limit the invention in any way.

[1] Synthesis of Organosilicon Compounds

Synthesis Example 1

The organosilicon compound of formula (3-1) below was synthesized from 2-methylimidazole and 3-chloropropyltrimethoxysilane in accordance with the method disclosed in JP-A H05-39295.

[Chem. 7]

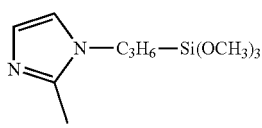

(3-1)

Synthesis Example 2

The organosilicon compound of formula (4-1) below was synthesized from 2-methylimidazole and 3-isocyanatopropyltrimethoxysilane in accordance with the method disclosed in JP No. 3555845.

[Chem. 8]

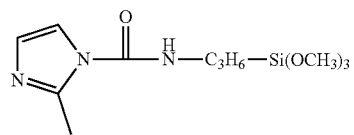

(4-1)

Synthesis Example 3

A mixture of the organosilicon compounds of formulas (5-1), (7-1) and (8-1) below was synthesized from 2-methylimidazole and 3-glycidoxypropyltrimethoxysilane in accordance with the method disclosed in JP-A H05-186479.

[Chem. 9]

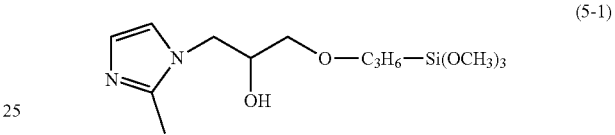

(5-1)

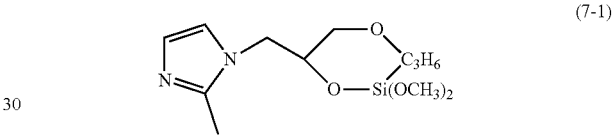

(7-1)

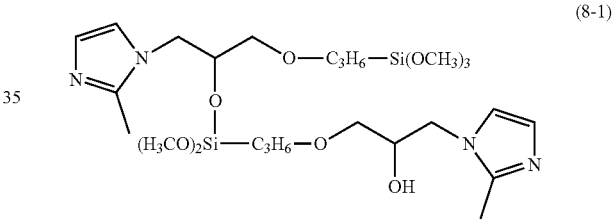

(8-1)

Synthesis Example 4

The organosilicon compound of formula (6-1) below was synthesized from 2-methylimidazole and 3-methacryloxypropyltrimethoxysilane in accordance with the method disclosed in JP No. 3523804.

[Chem. 10]

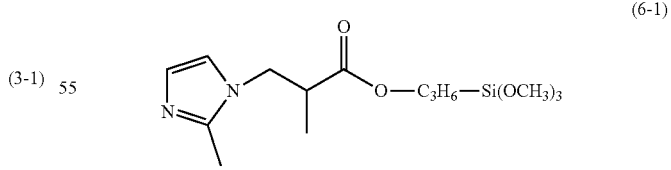

(6-1)

Synthesis Example 5

A mixture of the organosilicon compounds of formulas (7-1), (9-1), (10-1) and (13) below was synthesized from 2-methylimidazole, 3-glycidoxypropyltrimethoxysilane and 3-isocyanatopropyltrimethoxysilane in accordance with the method disclosed in JP No. 4372461.

[Chem. 11]

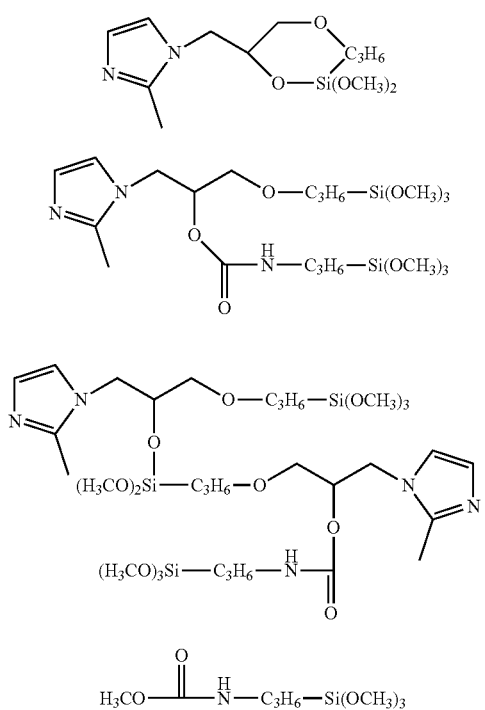

Synthesis Example 6

The organosilicon compound of formula (11-1) below was synthesized from 1-vinyl-2-methylimidazole and 3-mercaptopropyltrimethoxysilane in accordance with the method disclosed in JP No. 3555802.

[Chem. 12]

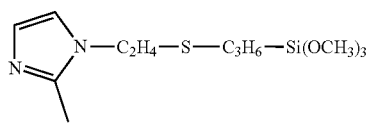

Synthesis Example 7

The organosilicon compound of formula (12-1) below was synthesized from 2-methyl-1-allylimidazole and 3-mercaptopropyltrimethoxysilane in accordance with the method disclosed in JP No. 3555802.

[Chem. 13]

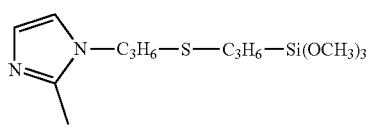

[2] Production of Bile Acid Adsorbent Composed of Organosilicon Compound-Bonded Silica Particles

Example 1-7

One hundred parts by weight of a 1:9 (by weight) mixture of water and methanol and 30 parts by weight of silica (Nipsil NS-KR, from Tosoh Silica Corporation) were mixed together at 25° C., 3 parts by weight of the respective organosilicon compounds obtained in Synthesis Examples 1 to 7 was added, and stirring at 50° C. was carried out for 4 hours. After the completion of stirring, the solvent was removed by filtration and the remaining matter was washed with methanol and then dried in vacuo at 110° C. for 1 hour, giving a bile acid adsorbent composed of organosilicon compound-bonded silica particles.

The bile acid adsorption ratio and the tendency for swelling due to water absorption of each of the bile acid adsorbents obtained in Examples 1 to 7 were measured and evaluated according to the following procedures. The results are shown in Table 1.

Measurement of Bile Acid Adsorption Ratio (1) A glycolic acid solution (100 μmol/L) composed of 0.1 g of commercial glycolic acid dissolved in 1 L of a pH 8 Tris buffer was prepared as a bile acid sample.

(2) The glycolic acid solution was mixed with 100 mg of the respective bile acid adsorbents obtained in Examples 1 to 7, following which the mixture was shaken and then centrifuged. The glycolic acid concentration of the supernatant was computed from the absorbance, and the bile acid adsorption ratio was determined.

Evaluation of Swelling Due to Water Absorption

When the glycolic acid solution prepared in the same way as in the above method for measuring the bile acid adsorption ratio was mixed with 100 mg of the respective bile acid adsorbents obtained in Examples 1 to 7, the mixture in each case was visually checked for the presence or absence of swelling by the bile acid adsorbent. The results are presented in Table 1.

The bile acid adsorption ratio and tendency for swelling due to water absorption were measured or evaluated in Comparative Examples 1 and 2 below as well. Those results are also presented in Table 1.

Comparative Example 1

In this example, 100 mg of untreated silica (Nipsil NS-KR, from Tosoh Silica Corporation) was used instead of the 100 mg of the respective bile acid adsorbents obtained in Examples 1 to 7.

Comparative Example 2

In this example, 100 mg of a commercial bile acid adsorbent (Cholebine, from Mitsubishi Tanabe Pharma Corporation) was used instead of the 100 mg of the respective bile acid adsorbents obtained in Examples 1 to 7.

TABLE 1

| Bile acid adsorbent | Organosilicon compound | Bile acid adsorption ratio (%) | Swelling due to water absorption |
|---|---|---|---|
| Example 1 | formula (3-1) | 42.0 | no |
| Example 2 | formula (4-1) | 41.5 | no |
| Example 3 | formulas (5-1), (7-1), (8-1) | 41.8 | no |
| Example 4 | formula (6-1) | 42.2 | no |
| Example 5 | formulas (7-1), (9-1), (10-1), (13) | 43.1 | no |
| Example 6 | formula (11-1) | 41.0 | no |
| Example 7 | formula (12-1) | 40.8 | no |
| Comparative Example 1 | — | 34.8 | no |
| Comparative Example 2 | — | 52.1 | yes |

As shown in Table 1, the bile acid adsorbents of the invention exhibited a high bile acid adsorbing capacity compared with the untreated silica in Comparative Example 1. Moreover, even when mixed with water, they did not swell.

On the other hand, Cholebine in Comparative Example 2 exhibited a high bile acid adsorbing capacity, but swelling due to water absorption was observed.

The invention claimed is:

1. A bile acid adsorbent comprising silica particles to which an organosilicon compound of general formula (1) below is bonded

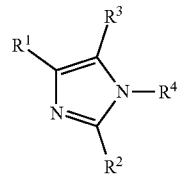

(1)

wherein $R^1$, $R^2$ and $R^3$ are each independently a hydrogen atom, an alkyl group of 1 to 20 carbon atoms, a vinyl group, a phenyl group or a benzyl group, with the proviso that $R^1$ and $R^3$ may mutually bond to form a benzene ring; and $R^4$ is a group of general formula (2) below

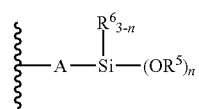

(2)

wherein A is a linear or branched divalent linkage group which may include a heteroatom, a urethane bond, a urea bond, a thiourethane bond and/or a thiourea bond; each $R^5$ is independently an alkyl group of 1 to 10 carbon atoms or an aryl group of 6 to 10 carbon atoms; each $R^6$ is independently an alkyl group of 1 to 10 carbon atoms or an aryl group of 6 to 10 carbon atoms; and n is an integer from 1 to 3.

2. The bile acid adsorbent of claim 1, wherein $R^4$ is a group of any one of formulas (3) to (12) below

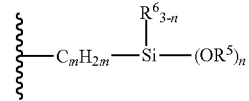
(3)

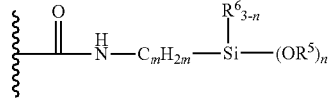
(4)

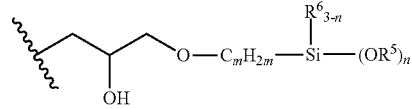
(5)

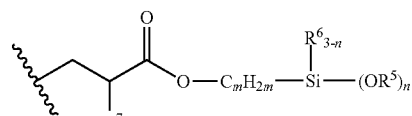
(6)

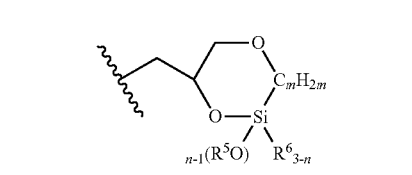
(7)

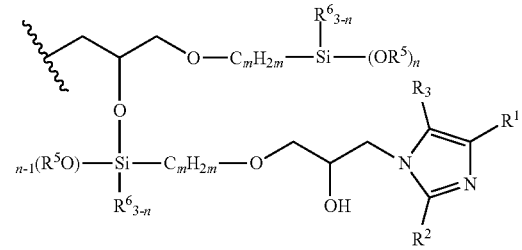
(8)

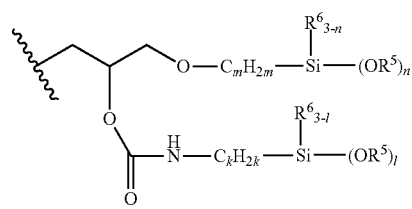
(9)

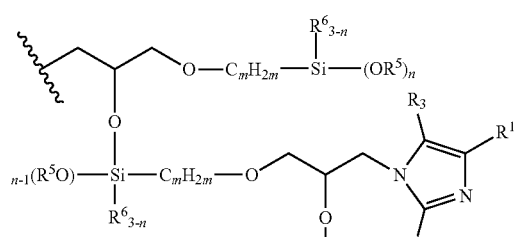
(10)

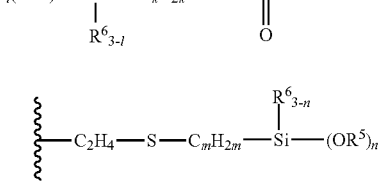
(11)

-continued

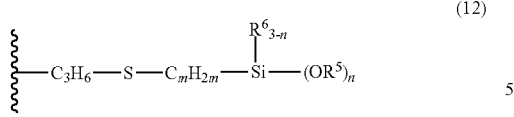
(12)

wherein m is an integer from 1 to 12, $R^7$ is a hydrogen atom or an alkyl group of 1 to 3 carbon atoms, k is an integer from 1 to 12, l is an integer from 1 to 3, and $R^1$, $R^2$, $R^3$, $R^5$, $R^6$ and n are as defined above.

3. A preparation comprising the bile acid adsorbent of claim 1 and an enteric coating.

4. The preparation of claim 3, wherein the enteric coating comprises one or more selected from the group consisting of hydroxypropyl methylcellulose phthalate, hydroxypropyl methylcellulose acetate succinate and carboxymethyl ethyl cellulose.

5. A food product comprising the bile acid adsorbent of claim 1.

6. A supplement comprising the bile acid adsorbent of claim 1.

\* \* \* \* \*